3,170,764
PROCESS FOR PRODUCING NON-MAGNETIC
FINELY GROUND MATERIALS SUCH AS
CHARCOAL AND CALCIUM CARBONATE
Joseph W. Ayers and Justus K. Orlemann, Easton, Pa.,
assignors to Agrashell, Inc., Los Angeles, Calif., a
corporation of Delaware
No Drawing. Filed May 6, 1959, Ser. No. 811,252
14 Claims. (Cl. 23—209.1)

This invention relates to wet grinding in mills having metal grinding elements composed of materials having the property of creating in the aqueous vehicle in the mill an alkalinity of a strangth which in conventional operations causes the formation of a ferrite through reaction involving the iron or other metal of the grinding elements. It particularly relates to grinding methods for the production of improved finely ground vegetable charcoal carbons for use in resinous molding compositions for phonograph record production, of the basic properties and utilities disclosed in the copending application Serial No. 645,658, now abandoned, filed March 13, 1957, by Joseph W. Ayers, one of the present applicants, and by Pershing V. Jones.

The invention disclosed and claimed in said copending application includes products defined as hydrophobic vegetable charcoal carbons, preferably of 5 micron top size, having a volatilizable content not exceeding 10%, by weight, and an oil absorption averaging less than 50 grams of oil per 100 grams of charcoal carbon. These products are mixed with other ingredients to provide extender compositions, and are ultimately incorporated in a suitable resin binder to produce phonographic record molding compositions.

It has now been discovered that in the grinding of charcoal to a fine particle size in mills using steel balls, the hard charcoals are very abrasive and that the grinding abrades the iron (also other metals in the steel) and produces particles of colloidal size which become converted to magnetite or ferroso-ferric oxide due to the heat and environmental conditions present in the mill during the grinding operation. Under the conditions created, the water appears to take up oxygen from the air which reacts with the abraded iron to form magnetic iron oxide.

The presence of iron compounds in appreciable amounts in certain commonly employed molding compositions and hence also in extenders used therein is objectionable, especially when the iron is in magnetic form.

A primary object of the instant invention is to provide processes for producing finely divided charcoal carbons ground by the action of tumbling steel balls, which are free of, or substantially free of, magnetic iron and magnetizable iron compounds.

Another important object is to provide processes for producing such charcoal carbons which have a lower total iron content than charcoal carbons normally resulting from grinding in mills using steel balls.

Another object is to produce such charcoal carbons having little or no magnetic iron content and also a lower total iron content by processes which are economical from all standpoints, including equipment required, raw materials used, and time and labor costs involved.

A broader object is to provide ground non-magnetic materials from coarser particles of materials in general having the property of acquiring magnetic properties when the grinding is effected in aqueous media in mills containing grinding surfaces composed of a metal or metals which form ferrites from the abraded metal content.

The processes of the invention are applicable to the grinding of charcoal, calcium carbonate rock and other materials which, on grinding under normal conditions in an aqueous medium in a mill having grinding surfaces of steel or other ferrite-forming metal, develops in the aqueous medium an alkalinity of a strength which causes the formation of a ferrite or magnetic material. The processes involve the addition of a pH control agent to the aqueous medium in the mill containing the coarse material to be ground in a quantity which avoids the formation of ferrites in the metal abraded from the metal surfaces, and grinding the coarse material to the desired finer size.

The process of the invention is applicable to charcoals as a class, for in aqueous suspension they normally reveal a pH value in the range of from 8 to 10. The processes of the invention are applicable to mills having grinding elements composed of or containing iron, manganese, chromium or nickel, for all of these metals can form ferrites which are magnetizable. Other grinding elements containing two or more metals are those capable of producing, for example, cobalt-iron ferrite, manganese-iron ferrite, zinc-manganese-iron ferrite, and the like.

The pH control agents used in the process of the present invention create an environment in the aqueous media in the mill which prevents the formation of metallic compounds having spinel structures that are susceptible to magnetization, which structures usually form under aqueous alkaline conditions. The agents may be divided into three categories. The mode of operation of the three classes of agents are basically different, but the total action of certain of the agents may include the mode of action of an agent in another class.

The first and most important class of pH control agents may be defined as phosphates, which term includes hydrogen phosphates or phosphoric acids and as well, alkali metal salts and other soluble salts of phosphates including orthophosphates, pyrophosphates, metaphosphates, hypophosphates and others as secondary sodium phosphate and sodium pyrophosphate. Only a small amount of the phosphate is required. When phosphoric acid is employed, the quantity required is ordinarily no more than 0.4% in relation to the charcoal treated (having a pH value of 8). Larger or smaller amounts may be used in specific instances, as from .01 to 10%. The optimum amount in any specific operation can be determined by routine test.

The manner in which the phosphate serves its intended function is not definitely known, but possibly, the phosphate or phosphoric acid ions act catalytically, for although intermediate reactions involving the phosphate ions occur during the grinding operation, the ultimate reaction appears to involve only the following:

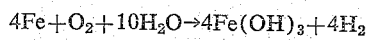

During the grinding operation, the pH value of the aqueous medium remains on the alkaline side. Although it changes somewhat during the operation, ordinarily the final value is not appreciably different from the alkalinity initially established in the aqueous medium by the charcoal.

This grinding process employing the phosphate leads not only to ground products which are free of any ferrite but also to ground products containing substantially less total iron content than products obtained by the process carried out under identical grinding conditions but in the absence of any pH control agent. The phosphate ions apparently act as a pacifier and through this action have a material effect upon the metal surfaces in decreasing the rate of corrosion and abrasion.

The second category of pH control agents may be described as acidic compounds which bring about a reaction between the iron or other metal abraded from the grinding surfaces, either directly or indirectly, and form water-insoluble compounds of the metal which are non-magnetic. Various organic acids, such as tannic acid, have this property. The acid added may serve a double function, one being to depress the pH value of the aqueous media and the other to bind the iron into the water-insoluble product. The amount of tannic acid or other acid required in any particular operation can be determined by routine tests, the needed amount being dependent on many factors including the amount and nature of the metal abraded from the grinding surfaces, the reactivity of the acid, the hydrogen ion concentration of the aqueous media in the grinding mill and the temperature and duration of the grinding operation. The agents in this class serve effectively to prevent the formation of ferrites or magnetic material in the ground product and may also reduce to some degree the amount of iron or other metal taken up by the ground material.

The third category of pH control agents may be defined as those acidic substances which are capable of lowering the pH value of the aqueous medium containing the material to be ground to an acid value but do not form insoluble salts with the abraded metal. These agents may be defined further as those compounds which depress the alkalinity of the aqueous media in the mill to such a degree that the oxidizing reaction mechanism of the iron or other metal proceeds in such a way that oxides, hydroxides or hydrates of the iron or other metal are formed with the metal in a non-magnetizable state, e.g., with the iron bound in a non-magnetizable ferric form, rather than ferrites.

The agents of this third category include acids, acid salts and acid-hydrolyzing salts. The acids utilizable include mineral acids such as sulfuric and hydrochloric which will not form ferrites during the grinding operation in the mill. Operable salts include those derived from strong acids and weak bases such as sulfates and chlorides of aluminum and zinc.

Since the sole necessary function of the acid or acid compound of this category is to maintain the aqueous media in the mill under acidic conditions, the particular acid compound employed is of little importance so long as no objectionable contaminant is introduced into the ground charcoal or other product. The acid or acid compound is preferably added to the mill periodically but may be added all at once at the beginning of the grinding operation.

The amount of acid or acid compound required in any particular operation can easily be determined by routine test. When acids such as sulfuric acid are employed, the amount required is sufficient if the pH value is maintained at about a pH value of 6. With acid-hydrolyzing salts the amount generally giving the adequate results is that which maintains the pH value at a pH of 7 or slightly lower.

The amount of acid compound employed in any of the categories should not be excessive, for acid conditions in the aqueous media in the mill lead to corrosion and undesired increases in the quantity of metal abraded from the grinding surfaces.

The process of the invention applies to the grinding of the materials herein defined from any coarse condition to any smaller particle size. It is particularly applicable where very fine grinding is involved as in the provision of the charcoal carbon products described in the hereinbefore mentioned patent application where a reduction to sizes below 325 mesh is described.

In the examples hereinafter set out a dense charcoal carbon derived by charring walnut shells at a high temperature in the absence of air, and revealing an alkalinity of pH 8 was mixed with water to provide a 40% slurry and introduced with the pH control agent into a ball mill having a steel lining and containing steel balls. The mill was operated under conditions which elevated the temperature of the mass being ground to 150° F. and maintained it there. Samples of the slurry were checked at ½ hour intervals during the milling period to determine the pH value and temperature. When necessary an additional quantity of the agent was added to hold the slurry at the indicated pH level.

*Example 1*

Phosphoric acid was added to the slurry to be ground in the mill in the amount of 0.408% based on the weight of the charcoal. The grinding was continued for 5 hours during which time the pH value remained around 8. After separation of the aqueous media, a ground product of very fine particle size was obtained which was free of magnetic properties. The ferric oxide content of the product was 2.46% which figure is substantially lower than the 5.86% ferric oxide content of a product obtained from the same charcoal in a grinding operation identical in all respects except that no phosphoric acid or other pH control agent was added.

*Example 2*

Quebracho extract, which contains tannic acid, was added to the slurry in the mill in a quantity providing 4.04% of the weight of the charcol. After 5 hours of grinding in which the aqueous medium was maintained at a pH value averaging 7.7 by periodic additions of the extract, a ground product was obtained free of magnetic properties but containing 3.09% of ferric oxide. This amount of iron represents a substantially lesser amount of iron contaminant.

*Example 3*

Aluminum sulfate, $Al_2(SO_4)_3 \cdot 18H_2O$, in a quantity amounting to 13.3% of the weight of the charcoal was added to the mill with the charcoal in the aqueous media and grinding was continued for 4½ hours, the pH value being on the acid side and averaging 6.3. The ground product obtained was free of magnetic properties.

In the foregoing examples other pH control agents may be substituted with comparable results. Also calcium carbonate rock and other materials having the property of forming alkaline solutions on hydrolyzing in the aqueous medium in wet grinding mills may be substituted and comparable results will be obtained. Other charcoals which can be treated in the same way are those derived from non-fibrous nut shells such as black walnut shells, also peach pits, apricot pits, coconut shells, endocarps of drupes generally, woods and particularly dense woods such as lignum vitae and other high density, lignocellulosic materials.

It should be understood that the present invention is not limited to the specific materials and procedures herein disclosed but that it extends to all equivalents which will occur to those skilled in the art upon consideration of the general teachings set forth herein and the scope of the claims appended hereto.

We claim:

1. A process for excluding ferromagnetic properties from finely ground solids formed by the grinding, by metal grinding surfaces, of non-metallic solid material that normally is non-ferromagnetic but which upon said grinding will exhibit ferromagnetic properties resulting from the presence in the material of ferromagnetic particles derived by abrasion of minute metalliferous particles from said grinding surfaces, which comprises oxidizing to non-ferromagnetic form the minute metalliferous particles incorporated into said solids by abrasion from said grinding surfaces in the course of said grinding, thereby converting said solids to a finely ground form substantially free of ferromagnetic properties.

2. A process for excluding ferromagnetic properties from finely ground solids formed by the grinding, by metal grinding surfaces, of non-metallic solid material that normally is non-ferromagnetic but which upon said grinding will exhibit ferromagnetic properties resulting from the presence in the material of ferromagnetic particles derived by abrasion of minute metalliferous particles from said grinding surfaces, which comprises in the course of said grinding oxidizing to non-ferromagnetic form the minute metalliferous particles incorporated into said solids by abrasion from said grinding surfaces, thereby converting said solids to a finely ground form substantially free of ferromagnetic properties.

3. A process for excluding ferromagnetic properties from finely ground solids formed by the grinding, by metal grinding surfaces in the presence of oxygen and of an aqueous medium, of solid material that normally renders said medium alkaline and normally is non-ferromagnetic but which upon said grinding will exhibit ferromagnetic properties attributable to the presence in the material of ferromagnetic particles formed by the oxidation in an alkaline aqueous medium of minute particles abraded from said grinding surfaces, which comprises by carrying out said grinding in the presence of a pH control agent added to said aqueous medium and effective to maintain in said medium pH conditions under which said minute particles will not be oxidized therein to ferromagnetic form, oxidizing to non-ferromagnetic form in the course of said grinding the minute particles incorporated into said material by abrasion from said grinding surfaces, thereby converting said material to a finely ground form substantially free of ferromagnetic properties.

4. A process for excluding ferromagnetic properties from finely ground solids formed by the grinding, by ferrous metal grinding surfaces in the presence of oxygen and of an aqueous medium, of solid material that normally renders said medium alkaline and normally is non-ferromagnetic but which upon said grinding will exhibit ferromagnetic properties attributable to the presence in the material of ferromagnetic particles formed by the oxidation in an alkaline aqueous medium of minute particles abraded from said grinding surfaces, which comprises by carrying out said grinding in the presence of a pH control agent added to said aqueous medium and effective to maintain in said medium pH conditions under which said minute particles will not be oxidized therein to ferromagnetic form, oxidizing to non-ferromagnetic ferric oxide in the course of the grinding the minute particles incorporated into said material by abrasion from said grinding surfaces, thereby converting said material to a finely ground form substantially free of ferromagnetic properties.

5. A process for excluding ferromagnetic properties from finely ground solids formed by the grinding, by ferrous metal grinding surfaces in the presence of oxygen and of an aqueous medium, of solid material that normally renders said medium alkaline and normally is non-ferromagnetic but which upon said grinding will exhibit ferromagnetic properties attributable to the presence in the material of ferromagnetic particles formed by the oxidation in an alkaline aqueous medium of minute particles abraded from said grinding surfaces, which comprises by carrying out said grinding in the presence of a water-soluble acidic compound added to said medium and effective to keep said medium in a non-alkaline condition oxidizing to non-ferromagnetic ferric oxide in the course of the grinding the minute particles incorporated into said material by abrasion from said grinding surfaces, thereby converting said material to a finely ground form substantially free of ferromagnetic properties.

6. A process for the grinding of charcoal, calcium carbonate and other hard materials which develop alkalinity in aqueous media in a wet-grinding mill by abrasion against steel grinding surfaces, which comprises, grinding the material in the presence of oxygen and in an aqueous medium having incorporated therein a pH control agent effective to maintain therein pH conditions under which metal abraded from said surfaces will not be oxidized therein to a ferromagnetic oxide, and thereby during the grinding oxidizing substantially all of the iron abraded from the grinding surfaces to a non-magnetic ferric state.

7. A process for the grinding of charcoal, calcium carbonate and other hard materials which develop alkalinity in aqueous media in a grinding mill containing an aqueous liquid and using metal grinding elements which contain a metal capable in the presence of oxygen of forming a magnetic ferrite under aqueous alkaline conditions, which comprises, introducing a phosphate into the aqueous medium in the mill with the coarse material, in an amount sufficient to inhibit the formation of ferrite from the metal abraded from said elements, and wet-grinding the resulting mass until the desired reduction in particle size is obtained, thereby providing the ground material in a condition substantially free of any ferrite.

8. A process for the grinding of charcoal, calcium carbonate and other hard materials which develop alkalinity in aqueous media in a grinding mill containing an aqueous liquid and using metal grinding elements which contain a metal capable in the presence of oxygen of forming a magnetic ferrite under aqueous alkaline conditions, which comprises, introducing phosphoric acid into the aqueous medium in the mill with the coarse material, in an amount sufficient to inhibit the formation of ferrite from the metal abraded from said elements, and wet-grinding the resulting mass until the desired reduction in particle size is obtained, thereby providing the ground material in a condition substantially free of any ferrite.

9. A process for producing ground charcoal in a finely-divided and non-magnetic condition, and by grinding charcoal in a wet-grinding mill containing steel grinding surfaces, which comprises, introducing phosphate ion-providing compound into the mill with an aqueous suspension of the charcoal to be ground, in an amount sufficient to inhibit the formation of ferrite from the metal abraded from said surfaces, and wet-grinding the resulting mass until the desired reduction in particle size is obtained, thereby providing the ground material in a condition substantially free of any ferrite.

10. A process for producing ground carbon in a finely-divided, non-magnetic condition by grinding hard carbon in a wet-grinding mill containing an aqueous medium and using steel balls, which comprises, introducing a phosphoric acid into the mill with the aqueous mass of carbon to be ground, in an amount sufficient to inhibit the formation of ferrite from the metal abraded from said balls, and wet-grinding the resulting mass until the desired reduction in particle size is obtained, thereby providing the ground material in a condition substantially free of any ferrite.

11. A process for the grinding of charcoal, calcium carbonate and other hard materials which develop alkalinity in aqueous media, in a wet-grinding mill containing an aqueous medium and using metal grinding elements which contain a metal capable in the presence of oxygen of forming a magnetic ferrite under aqueous alkaline conditions, which comprises, grinding the material in said mill and during the grinding converting the metal abraded from said grinding elements into a non-magnetizable water-insoluble form by reacting the abraded metal with tannic acid added to said aqueous medium.

12. A process for the grinding of charcoal, calcium carbonate and other hard materials which develop alkalinity in aqueous media, in a wet-grinding mill containing an aqueous medium and using metal grinding elements which contain a metal capable in the presence of oxygen of forming a magnetic ferrite under aqueous alkaline conditions, which comprises, grinding the material in said mill and during the grinding converting the metal abraded from said grinding elements into a non-magetizable water-insoluble form by reacting the abraded metal with Quebracho extract added to said aqueous medium.

13. A process for producing non-magnetic finely divided materials of low iron content from charcoal, calcium carbonate and other hard materials which develop alkalinity in aqueous media upon being ground in wet-grinding mills containing aqueous media and using steel grinding surfaces, which comprises, adding a phosphoric acid compound to the aqeuous medium in the mill containing the material to be ground, in a quantity sufficient to cause oxidation of the iron abraded from the steel surfaces to a non-magnetizable ferric form, and wet-grinding the resulting mixture until the material is ground to the desired particle size.

14. A process for producing finely divided, non-magnetic charcoal of low iron content in wet-grinding operations in mills containing aqueous media and using steel grinding elements, which comprises, adding phosphoric acid to the aqueous medium in the mill with the coarse charcoal, in a quantity sufficient to cause the iron abraded from the steel surfaces to be oxidized to a non-magnetizable ferric form under alkaline conditions existing in the aqueous medium, and wet-grinding the resulting mixture until the material is ground to the desired particle size.

References Cited in the file of this patent

UNITED STATES PATENTS

| | | |
|---|---|---|
| 843,426 | Acheson | Feb. 5, 1907 |
| 1,552,973 | Walton | Sept. 8, 1925 |
| 1,614,352 | Dumond | Jan. 11, 1927 |
| 2,111,379 | Allen | Mar. 15, 1938 |
| 2,708,208 | Furman et al. | May 10, 1955 |
| 2,914,418 | Eastman | Nov. 24, 1959 |
| 2,979,532 | MacGregor | Apr. 11, 1961 |

FOREIGN PATENTS

| | | |
|---|---|---|
| 115,630 | Great Britain | Apr. 23, 1918 |
| 567,998 | Great Britain | Mar. 13, 1945 |